(12) United States Patent
Chiang

(10) Patent No.: US 12,488,851 B2
(45) Date of Patent: Dec. 2, 2025

(54) CONTENT ADDRESSABLE MEMORY APPARATUS, CONTENT ADDRESSABLE MEMORY CIRCUIT AND MEMORY SELF-TEST METHOD THEREOF

(71) Applicant: REALTEK SEMICONDUCTOR CORPORATION, Hsinchu (TW)

(72) Inventor: I-Hao Chiang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 2 days.

(21) Appl. No.: 18/595,469

(22) Filed: Mar. 5, 2024

(65) Prior Publication Data

US 2024/0312548 A1 Sep. 19, 2024

(30) Foreign Application Priority Data

Mar. 17, 2023 (TW) .................................. 112110021

(51) Int. Cl.
*G11C 29/36* (2006.01)
*G11C 29/20* (2006.01)

(52) U.S. Cl.
CPC .............. *G11C 29/36* (2013.01); *G11C 29/20* (2013.01); *G11C 2029/3602* (2013.01)

(58) Field of Classification Search
None
See application file for complete search history.

(56) References Cited

U.S. PATENT DOCUMENTS 5,553,082 A 9/1996 Connor et al.
7,643,353 B1 * 1/2010 Srinivasan ............. G11C 15/00
365/49.1

(Continued)

FOREIGN PATENT DOCUMENTS

TW 355797 4/1999

OTHER PUBLICATIONS

OA letter of a counterpart TW application (appl. No. 112110021) mailed on Jun. 18, 2024. Summary of the TW OA letter: 1. Claims 1, 7 and 10 are rejected as allegedly being unpatentable in view of cited reference 1 (TW 355797, also 1 published as U.S. Pat. No. 5553082A). 2. Claims 2~6 and 8~9 are allowable. Correspondence bewteen claims of TW counterpart application and claims of US application: 1. Claims 1, 2-3, . . . , and 10 in TW counterpart application correspond to claims 1-7 and 13-15 in US application, respectively.

(Continued)

*Primary Examiner* — Guerrier Merant
*Assistant Examiner* — Jack Kensington Barnett
(74) *Attorney, Agent, or Firm* — WPAT, PC

(57) ABSTRACT

The present disclosure discloses a content addressable memory apparatus. A self-test control circuit generates self-test driving signals and control an external test pattern generation circuit generates search data and an address signal. A content addressable memory circuit includes a memory circuit, an internal test pattern generation circuit and an internal comparison circuit. The memory circuit receives the search data and the address signal from the external test pattern generation circuit to perform search operation to generate actual match signals corresponding to the match lines. The internal test pattern generation circuit receives the self-test driving signals from the self-test control circuit to generate expected match signals. The internal comparison circuit receives and compares the actual match signals and the expected match signals to generate match comparison results such that the self-test control circuit receives the match comparison results and performs verification accordingly.

17 Claims, 6 Drawing Sheets

(56) References Cited

U.S. PATENT DOCUMENTS

| | | | |
|---|---|---|---|
| 7,707,472 B1* | 4/2010 | Dastidar | G11C 29/16 |
| | | | 714/733 |
| 2004/0015651 A1 | 1/2004 | Chadwick et al. | |
| 2006/0195743 A1* | 8/2006 | Aihara | G01R 31/31813 |
| | | | 714/738 |
| 2010/0251042 A1* | 9/2010 | Selking | G11C 29/02 |
| | | | 714/719 |

OTHER PUBLICATIONS

OA letter of a counterpart TW application (appl. No. 112110021) mailed on Dec. 23, 2024.
OA letter of a counterpart TW application (appl. No. 112110021) mailed on Mar. 14, 2025.

* cited by examiner

CONTENT ADDRESSABLE MEMORY APPARATUS, CONTENT ADDRESSABLE MEMORY CIRCUIT AND MEMORY SELF-TEST METHOD THEREOF

BACKGROUND OF THE INVENTION

1. Field of the Invention

The present disclosure relates to a content addressable memory apparatus, a content addressable memory circuit and a memory self-test method thereof.

2. Description of Related Art

Content addressable memories are a special type of computer memory that, under a normal operation mode, not only performs read operation and write operation on data, but also performs search operation on the stored data according to data-to-be-searched to generate a search result.

A self-test mechanism is required to be performed on the content addressable memories to test whether the operation of the match lines used to generate the search result is normal. However, under the condition that the storage amount of the content addressable memories is larger and the dimension of the devices within the content addressable memories is smaller due to the progress of the manufacturing process, the components related to the performance of the self-test may have an overlarge area and over-complex configuration when a good design is absent.

SUMMARY OF THE INVENTION

In consideration of the problem of the prior art, an object of the present disclosure is to provide a content addressable memory apparatus, a content addressable memory circuit and a memory self-test method thereof.

The present invention discloses a content addressable memory circuit that includes a memory circuit, an internal test pattern generation circuit and an internal comparison circuit. The memory circuit is configured to receive search data and an address signal so as to perform search operation and to generate a plurality of actual match signals corresponding to a plurality of the match lines. The internal test pattern generation circuit is configured to receive a plurality of self-test driving signals to generate a plurality of expected match signals. The internal comparison circuit is configured to receive and compare the actual match signals and the expected match signals to generate a plurality of match comparison results.

The present invention also discloses a content addressable memory apparatus that includes an external test pattern generation circuit, a self-test control circuit and a content addressable memory circuit. The self-test control circuit is configured to generate a plurality of self-test driving signals and control the external test pattern generation circuit to generate search data and an address signal. The content addressable memory circuit includes a memory circuit, an internal test pattern generation circuit and an internal comparison circuit. The memory circuit is configured to receive the search data and the address signal from the external test pattern generation circuit so as to perform search operation and to generate a plurality of actual match signals corresponding to a plurality of the match lines. The internal test pattern generation circuit is configured to receive the self-test driving signals from the self-test control circuit to generate a plurality of expected match signals. The internal comparison circuit is configured to receive and compare the actual match signals and the expected match signals to generate a plurality of match comparison results such that the self-test control circuit receives the match comparison results to perform verification on the match lines accordingly.

The present invention further discloses a memory self-test method used in a content addressable memory circuit. The memory self-test method includes steps outlined below. Search data and an address signal are received by a memory circuit so as to perform search operation and to generate a plurality of actual match signals corresponding to a plurality of the match lines. A plurality of self-test driving signals are received by an internal test pattern generation circuit to generate a plurality of expected match signals. The actual match signals and the expected match signals are received and compared by an internal comparison circuit to generate a plurality of match comparison results.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a content addressable memory (CAM) apparatus, a content addressable memory circuit and a memory self-test method thereof to dispose a test pattern generation circuit and a comparison circuit in the content addressable memory circuit such that a more compact and aligned arrangement of the content addressable memory circuit, the test pattern generation circuit and the comparison circuit can be obtained to greatly reduce routing area cost and complexity of the circuits.

Figure 1:
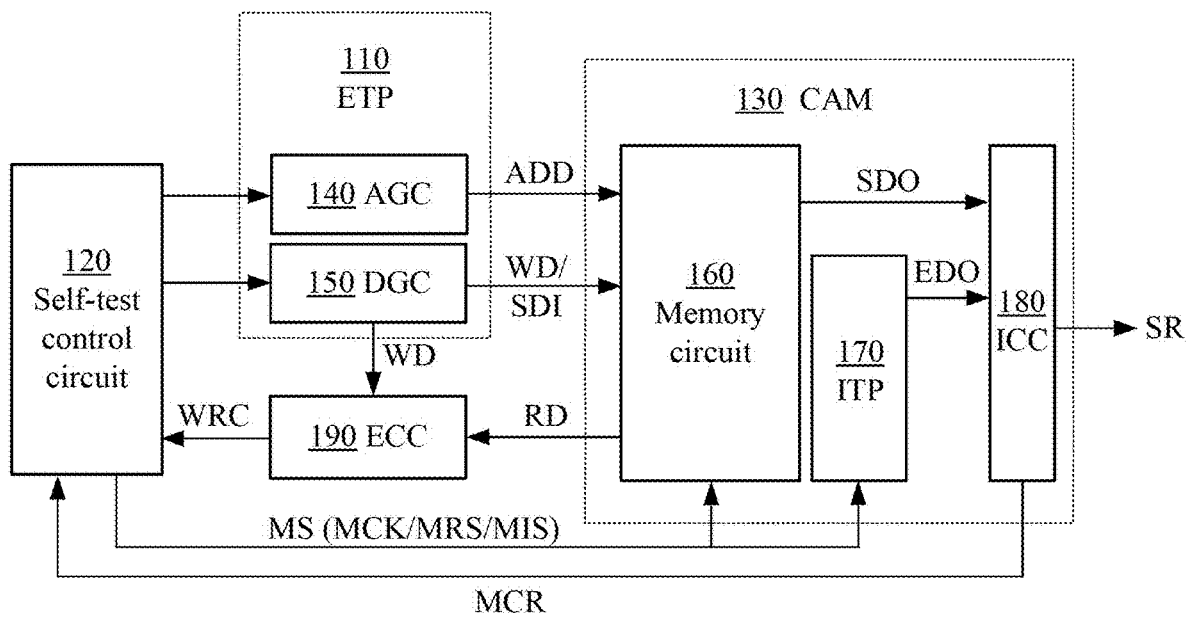
FIG. 1 illustrates a block diagram of a content addressable memory apparatus according to an embodiment of the present invention.

Reference is now made to FIG. 1. FIG. 1 illustrates a block diagram of a content addressable memory apparatus 100 according to an embodiment of the present invention. The content addressable memory apparatus 100 includes an external test pattern generation circuit 110 (abbreviated as ETP in FIG. 1), a self-test control circuit 120 and a content addressable memory circuit 130 (abbreviated as CAM in FIG. 1).

The content addressable memory circuit 130 is a special type of computer memory that, under a normal operation mode, not only performs read operation and write operation on data, but also performs search operation on the stored data according to data-to-be-searched to generate a search result SR. The content addressable memory circuit 130 is equipped with a self-test mechanism to perform self-test according to the signal feeding of the external test pattern generation circuit 110 and the self-test control circuit 120.

More specifically, the self-test control circuit 120 is configured to generate a plurality of self-test driving signals MS and control the external test pattern generation circuit 110 to generate data signal related to the test process and an address signal ADD.

The external test pattern generation circuit 110 is "external" to the content addressable memory circuit 130. More specifically, the external test pattern generation circuit 110 is disposed outside of the content addressable memory circuit 130 and includes an address generation circuit 140 (abbreviated as AGC in FIG. 1) and a data generation circuit 150 (abbreviated as DGC in FIG. 1). The address generation circuit 140 is configured to generate the address signal ADD according to the control of the self-test control circuit 120. The data generation circuit 150 is configured to generate the data signal related to the test process according to the control of the self-test control circuit 120.

The self-test performed by the content addressable memory circuit 130 can be distinguished into the self-test related to the read operation and the write operation and the self-test related to the search operation.

The self-test related to the read operation and the write operation can be performed by an external comparison circuit 190 (abbreviated as ECC in FIG. 1) further included by the content addressable memory apparatus 100. Similar to the external test pattern generation circuit 110, the external comparison circuit 190 is disposed outside of the content addressable memory circuit 130.

The address generation circuit 140 described above generates the address signal ADD according to the control of the self-test control circuit 120. The data generation circuit 150 described above generates a plurality of write data WD according to the control of the self-test control circuit 120. After receiving the self-test driving signals MS, the address signal ADD and the write data WD, the content addressable memory circuit 130 performs write operation and read operation accordingly to generate a plurality of read data RD. The external comparison circuit 190 is configured to receive the write data WD from the data generation circuit 150 and receive a plurality of the read data RD from the content addressable memory circuit 130 and perform compare operation on the write data WD and the read data RD to generate a plurality of read or write comparison results WRC such that the self-test control circuit 120 receives the read or write comparison results WRC to perform verification on the read or write operation of the content addressable memory circuit 130 accordingly.

The self-test related to the search operation can be performed by the internal components of the content addressable memory circuit 130.

The address generation circuit 140 described above generates the address signal ADD according to the control of the self-test control circuit 120. The data generation circuit 150 described above generates a plurality of search data SDI according to the control of the self-test control circuit 120. After receiving the self-test driving signals MS, the address signal ADD and the search data SDI, the content addressable memory circuit 130 performs search operation and the self-test related to the search operation.

The configuration of the content addressable memory circuit 130 and the self-test related to the search operation are further described in detail in the following paragraphs.

The content addressable memory circuit 130 includes a memory circuit 160, an internal test pattern generation circuit 170 (abbreviated as ITP in FIG. 1) and an internal comparison circuit 180 (abbreviated as ICC in FIG. 1).

The memory circuit 160 is configured to receive the search data SDI and the address signal ADD so as to perform search operation and to generate a plurality of actual match signals SDO corresponding to a plurality of match lines. In an embodiment, when an amount of the match lines is N, the amount of the actual match signals SDO is also N and these actual match signals SDO can be respectively expressed as $SDO_0$-$SDO_{N-1}$.

Figure 2:
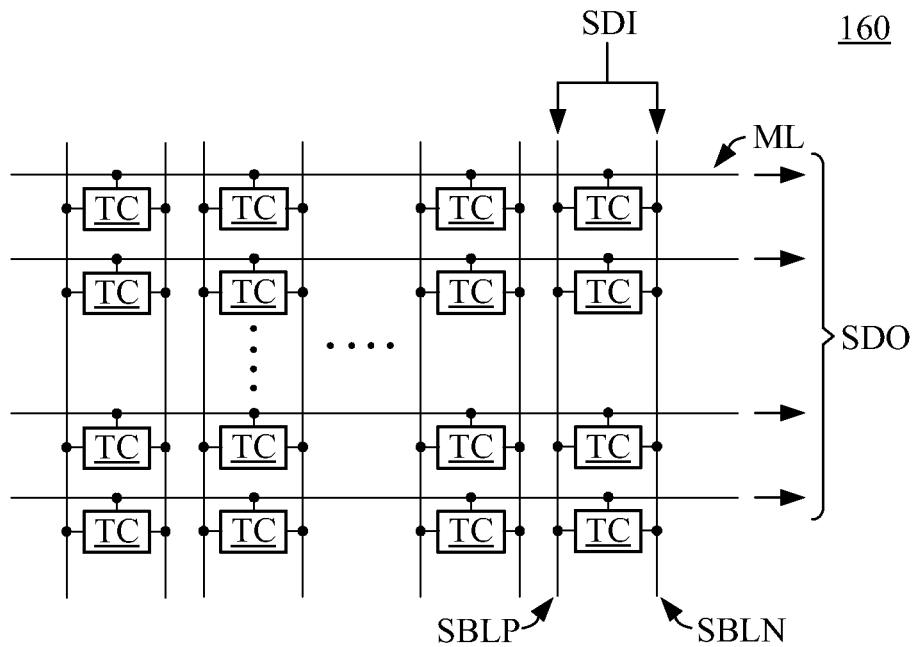
FIG. 2 illustrates a block diagram of the memory circuit according to an embodiment of the present invention.

Reference is now made to FIG. 2. FIG. 2 illustrates a block diagram of the memory circuit 160 according to an embodiment of the present invention. In an embodiment, the memory circuit 160 includes a plurality of ternary content addressable memory (TCAM) units TC that together form an array.

Figure 3:
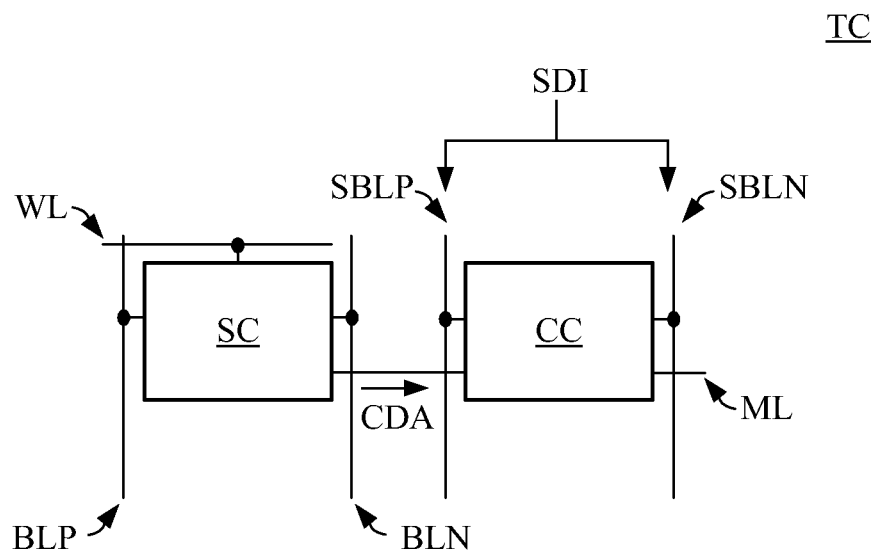
FIG. 3 illustrates a block diagram of a single TCAM unit according to an embodiment of the present invention.

Reference is now made to FIG. 3 at the same time. FIG. 3 illustrates a block diagram of a single TCAM unit TC according to an embodiment of the present invention. Each of the TCAM units TC includes a storage unit SC and a comparison unit CC.

The storage unit SC can perform read or write operation through bit lines BLP and BLN and a word line WL. The comparison unit CC can perform search operation through the match lines ML and search bit lines SBLP and SBLN.

It is appreciated that in order to simplify the diagram, access lines related to the search operation in FIG. 3 are selectively illustrated in FIG. 2, i.e., the match lines ML and the search bit lines SBLP and SBLN. Further, only the match lines ML and the search bit lines SBLP and SBLN corresponding to the TCAM unit TC located at the intersection of one of the rows and one of the columns are exemplarily labeled. The access lines related to the read or write operation in FIG. 3 (i.e., the bit lines BLP and BLN and the word line WL) are not illustrated in FIG. 2.

One match line ML is disposed corresponding to one row of TCAM unit TC and is pre-charged to a high state having a logic value of 1 in advance by a corresponding circuit (not illustrated in the figure) in the search operation. The comparison unit CC receives the search data SDI through the search bit lines SBLP and SBLN and receives stored data CDA from the storage unit SC. The comparison unit CC compares the search data SDI and the stored data CDA. When the search data SDI and the stored data CDA match, the comparison unit CC does not perform any further operation such that the match line ML is kept in the high state. When the search data SDI and the stored data CDA do not match, the comparison unit CC discharges the match line ML to pull the match line ML to a low state having a logic value of 0. The signals outputted by all the match lines ML are the actual match signals SDO.

In an embodiment, during the performance of the self-test, the memory circuit 160 may also receive the signal included in the self-test driving signals MS, such as but not limited to a clock signal and operate accordingly.

Due to the shrink of the dimension of the circuit element during the improvement of the manufacturing process, a coupling effect among the match lines ML related to the search operation performed on the memory circuit 160 easily occurs and results in an error in the search result SR. As a result, the outputs of the match lines ML can be verified by using the built-in self-test mechanism in the content addressable memory circuit 130 based on the generation of the test pattern.

In order to perform verification on the search result SR each of different combinations of the match lines ML, the content addressable memory circuit 130 writes the corresponding stored data CDA to the storage unit SC in FIG. 3 by using write operation in advance. When the self-test is performed, the comparison unit CC receives the stored data CDA according to the process described above, performs comparison on the stored data CDA and the search data SDI and determines the output state of the match lines ML.

The internal test pattern generation circuit 170 is configured to receive the self-test driving signals MS from the self-test control circuit 120 to generate a plurality of expected match signals EDO. In an embodiment, when the amount of the match lines is N, the amount of the expected match signals EDO is also N, in which these expected match signals EDO can be respectively expressed as $EDO_0$-$EDO_{N-1}$. The internal comparison circuit 180 is configured to receive and compares the actual match signals SDO and the expected match signals EDO to generate a plurality of match comparison results MCR. In an embodiment, when the amount of the match lines is N, the amount of the match comparison results MCR is also N, in which these match comparison results MCR can be respectively expressed as $MCR_0$-$MCR_{N-1}$.

Figure 4:
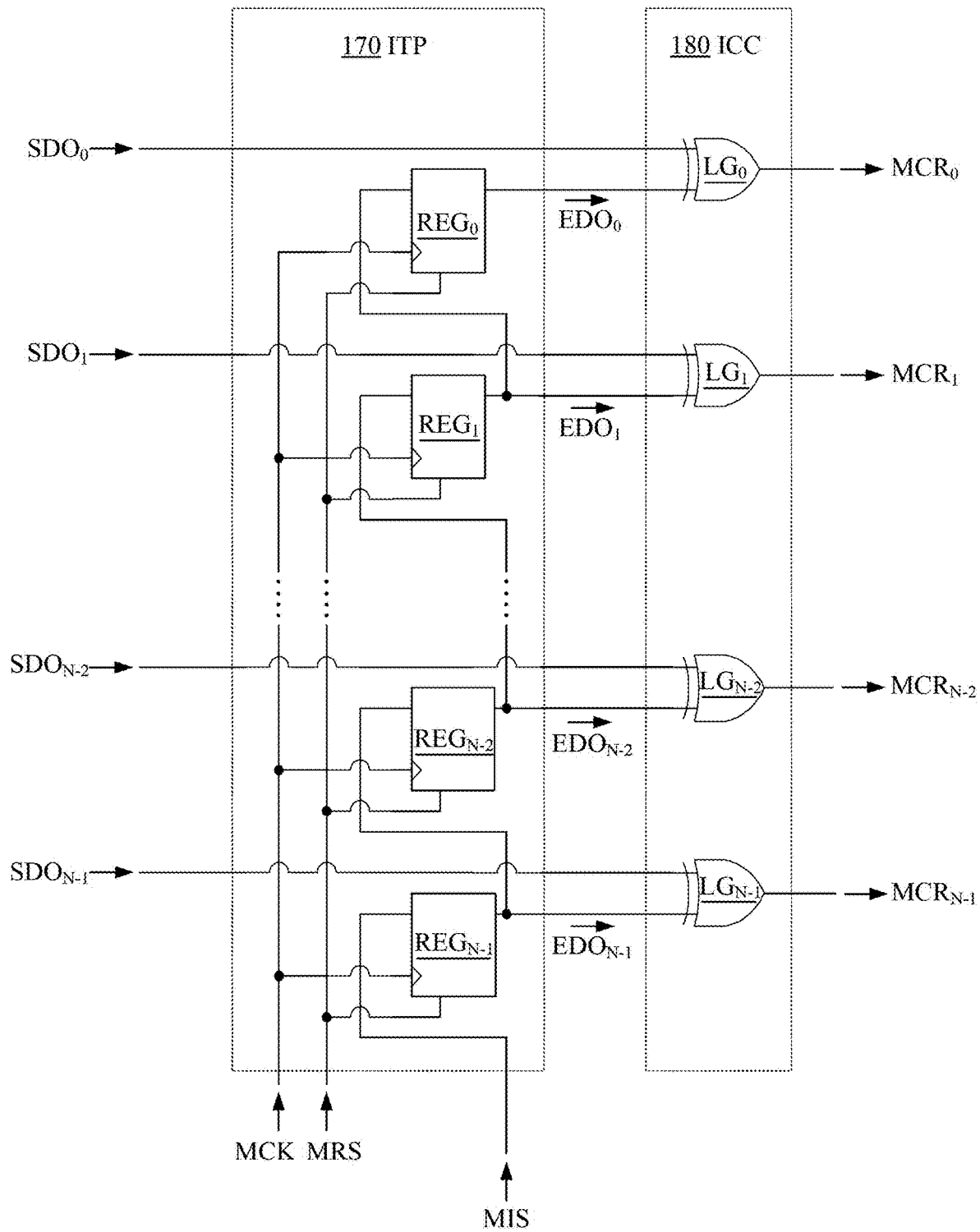
FIG. 4 illustrates a circuit diagram of the internal test pattern generation circuit and the internal comparison circuit according to an embodiment of the present invention.

Reference is now made to FIG. 4. FIG. 4 illustrates a circuit diagram of the internal test pattern generation circuit 170 and the internal comparison circuit 180 according to an embodiment of the present invention.

The internal test pattern generation circuit 170 includes a plurality of shift registers $REG_0$-$REG_{N-1}$. The shift registers $REG_0$-$REG_{N-1}$ are electrically coupled in series and has an amount equaling to the amount of the match lines ML.

The shift registers $REG_0$-$REG_{N-1}$ are configured to receive an input signal MIS included by the self-test driving signals MS and transmit the input signal MIS one-by-one according to a clock signal MCK included by the self-test driving signals MS. Each of the shift registers $REG_0$-$REG_{N-1}$ is configured to receive the reset signal MRS included by the self-test driving signals MS to generate one of the expected match signals $EDO_0$-$EDO_{N-1}$ according to the transmitted input signal MIS and the reset signal MRS.

More specifically, each of the shift registers $REG_0$-$REG_{N-1}$ receives the clock signal MCK through a clock input terminal and receives the reset signal MRS through a reset input terminal. The shift register $REG_0$ receives the input signal MIS through the input terminal thereof. The shift register $REG_0$ either transmits the input signal MIS through a signal output terminal thereof according to the clock signal MCK or is reset according to the reset signal MRS to generate the expected match signal $EDO_0$. Each of the shift registers $REG_1$-$REG_{N-1}$ is coupled to a previous one of the shift registers through the input terminal thereof and receives the input signal MIS therefrom. Each of the shift registers $REG_1$-$REG_{N-1}$ either transmits the input signal MIS through the signal output terminal thereof according to the clock signal MCK or is reset according to the reset signal MRS to generate the expected match signals $EDO_1$-$EDO_{N-1}$.

In an embodiment, a test pattern of the expected match signals $EDO_0$-$EDO_{N-1}$ is an all high state and all low state test pattern, a checkerboard test pattern or a marching test pattern.

Reference is now made to FIG. 5A to FIG. 5D. FIG. 5A to FIG. 5D respectively illustrate waveform diagrams of the expected match signals $EDO_0$-$EDO_{N-1}$ generated by the shift registers $REG_0$-$REG_{N-1}$ according to an embodiment of the present invention.

Figure 5A:
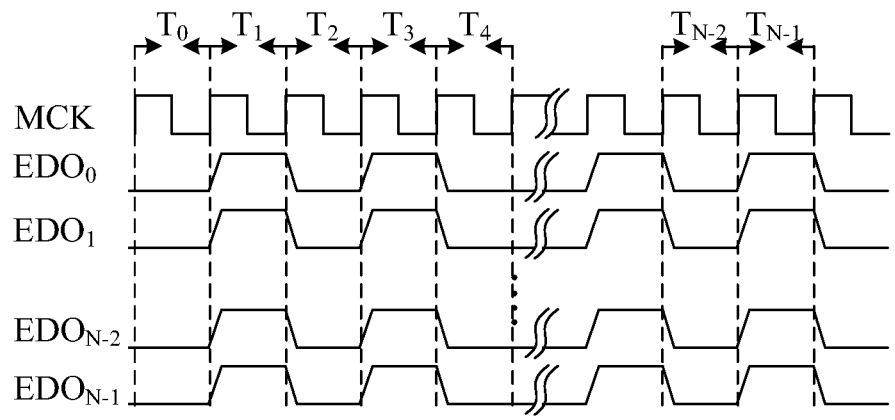
FIG. 5A to FIG. 5D respectively illustrate waveform diagrams of the expected match signals generated by the shift registers according to an embodiment of the present invention.

As illustrated in FIG. 5A, the shift registers $REG_0$-$REG_{N-1}$ is configured to be reset according to the reset signal MRS to generate the expected match signals $EDO_0$-$EDO_{N-1}$ that are all in the high state and the low state in an interlaced manner to perform the verification based on such an all high state and all low state test pattern. In the example of FIG. 5A, the expected match signals $EDO_0$-$EDO_{N-1}$ are all at the low state during the time periods $T_0$, $T_2$, $T_4$ . . . etc. The expected match signals $EDO_0$-$EDO_{N-1}$ are all at the high state during the time periods $T_1$, $T_3$ . . . etc.

Figure 5B:
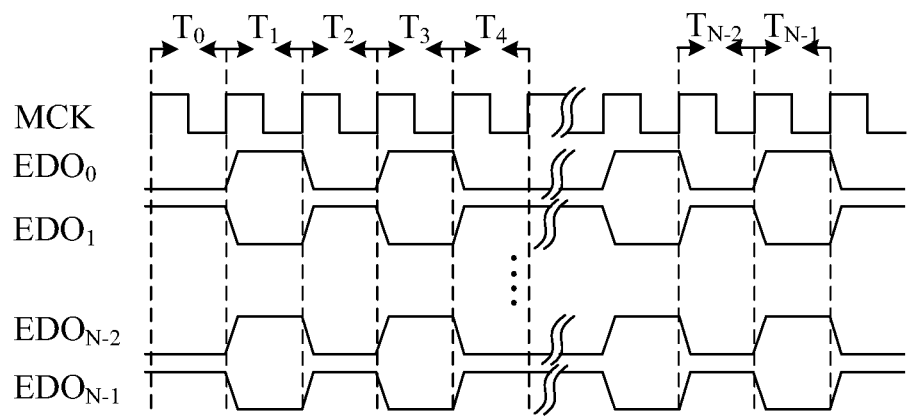

As illustrated in FIG. 5B, the shift registers $REG_0$-$REG_{N-1}$ is configured to generate the expected match signals $EDO_0$-$EDO_{N-1}$ according to the input signal MIS that switches between the low state and the high state in an evenly periodic manner to perform the verification based on such a checkerboard test pattern. In the example of FIG. 5B, if N is an even number, the expected match signals $EDO_0$, $EDO_2$, $EDO_4$, . . . $EDO_{N-2}$ are all at the low state during the time periods $T_0$, $T_2$, $T_4$ . . . etc and are all at the high state during the time periods $T_1$, $T_3$ . . . etc. The expected match signals $EDO_1$, $EDO_3$, $EDO_5$, . . . $EDO_{N-1}$ are all at the high state during the time periods $T_0$, $T_2$, $T_4$ . . . etc and are all at the low state during the time periods $T_1$, $T_3$ . . . etc.

Figure 5C:
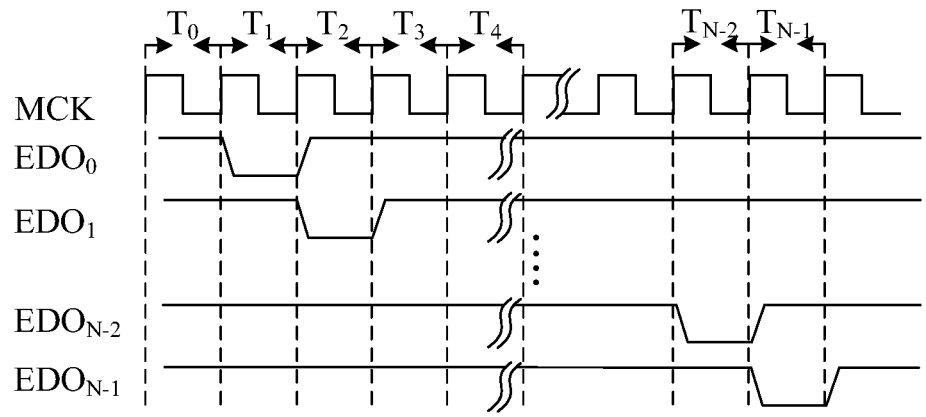

As illustrated in FIG. 5C, the shift registers $REG_0$-$REG_{N-1}$ is configured to generate the expected match signals $EDO_0$-$EDO_{N-1}$ according to the input signal MIS kept to be the high state and is only at the low state for a single time period to perform the verification based on such a marching test pattern. In the example of FIG. 5C, the expected match signals $EDO_0$-$EDO_{N-1}$ are kept to be the high state and are only at the low state respectively during the time period $T_0$, $T_1$, $T_2$ . . . $T_{N-1}$.

Figure 5D:
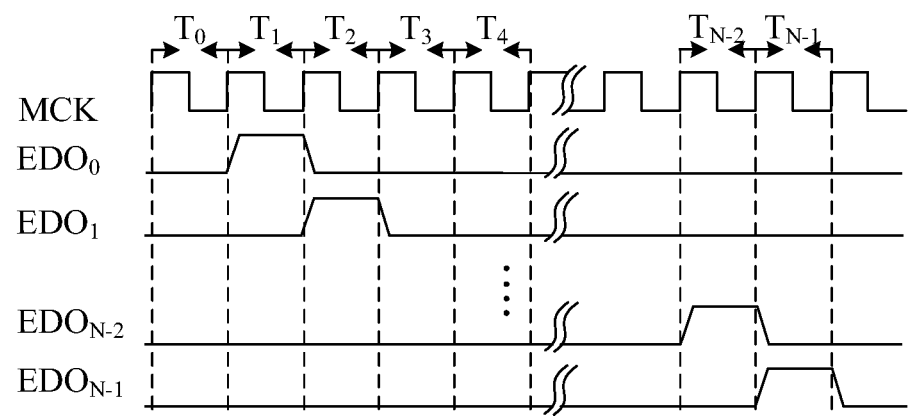

As illustrated in FIG. 5D, the shift registers $REG_0$-$REG_{N-1}$ is configured to generate the expected match signals $EDO_0$-$EDO_{N-1}$ according to the input signal MIS kept to be the low state and is only at the high state for a single time period to perform the verification based on such a marching test pattern opposite to the pattern in FIG. 5C. In the example of FIG. 5D, the expected match signals $EDO_0$-$EDO_{N-1}$ are kept to be the low state and are only at the high state respectively during the time period $T_0$, $T_1$, $T_2$ . . . $T_{N-1}$.

Reference is now made to FIG. 4. The internal comparison circuit 180 includes a plurality of logic operation gates $LG_0$-$LG_{N-1}$ having an amount equaling to the amount of the match lines ML.

Each of the logic operation gates $LG_0$-$LG_{N-1}$ receives one of the actual match signals $SDO_0$-$SDO_{N-1}$ and one of the expected match signals $EDO_0$-$EDO_{N-1}$ to perform logic operation thereon and generate an operation result serving as one of the match comparison results $MCR_0$-$MCR_{N-1}$. It is appreciated that in some embodiments, each of the logic operation gates $LG_0$-$LG_{N-1}$ can be electrically coupled to a buffer to amplify the respectively match comparison results $MCR_0$-$MCR_{N-1}$ by using the buffer.

In an embodiment, each of the logic operation gates $LG_0$-$LG_{N-1}$ is an exclusive OR gate (XOR gate) to perform exclusive OR logic operation.

Take the logic operation gate $LG_0$ as an example, when the actual match signal $SDO_0$ and the expected match signal $EDO_0$ are the same, the match comparison result $MCR_0$ generated by the logic operation gate $LG_0$ implemented by the exclusive OR gate is at the low state. When the actual match signal $SDO_0$ and the expected match signal $EDO_0$ are different, the match comparison result $MCR_0$ generated by the logic operation gate $LG_0$ implemented by the exclusive OR gate is at the high state. The other logic operation gates $LG_1$-$LG_{N-1}$ may operate based on the same mechanism and the operation thereof is not described herein.

The match comparison results $MCR_0$-$MCR_{N-1}$ generated by the logic operation gates $LG_0$-$LG_{N-1}$ are received by the self-test control circuit 120. The self-test control circuit 120 performs verification on the match lines ML according to the match comparison results $MCR_0$-$MCR_{N-1}$ to verify whether the operation of the match lines ML under the search operation is correct.

In an embodiment, under the normal operation mode of the content addressable memory circuit 130, the shift registers $REG_0$-$REG_{N-1}$ are reset according to the reset signal MRS to keep the expected match signals $EDO_0$-$EDO_{N-1}$ all at the high state or all at the low state, such that the logic operation gates $LG_0$-$LG_{N-1}$ in the internal comparison circuit 180 directly output the actual match signals $SDO_0$-$SDO_{N-1}$ according to the reset expected match signals $EDO_0$-$EDO_{N-1}$.

For the embodiment that each of the logic operation gates $LG_0$-$LG_{N-1}$ is implemented by an exclusive OR gate, the shift registers $REG_0$-$REG_{N-1}$ are reset according to the reset signal MRS to keep the expected match signals $EDO_0$-$EDO_{N-1}$ all at the low state. The operation result of the logic operation gates $LG_0$-$LG_{N-1}$ is equivalent to outputting the actual match signals $SDO_0$-$SDO_{N-1}$ generated by the match lines ML as the search result SR.

In some approaches, the self-test related to the search operation of the content addressable memory apparatus is performed by a test pattern generation circuit and a comparison circuit disposed outside of the content addressable memory circuit. However, in the application of large-scale system-on-a-chip configuration, the outputs of the match lines in a single memory may have an amount of 1024 or more. In such a configuration, the area cost and the complexity of the routing between the match lines of the content addressable memory circuit and the test pattern generation circuit and the comparison circuit.

As a result, the content addressable memory apparatus of the present invention disposes a test pattern generation circuit and a comparison circuit in the content addressable memory circuit such that a more compact and aligned arrangement of the content addressable memory circuit, the test pattern generation circuit and the comparison circuit can be obtained to greatly reduce routing area cost and complexity of the circuits.

Figure 6:
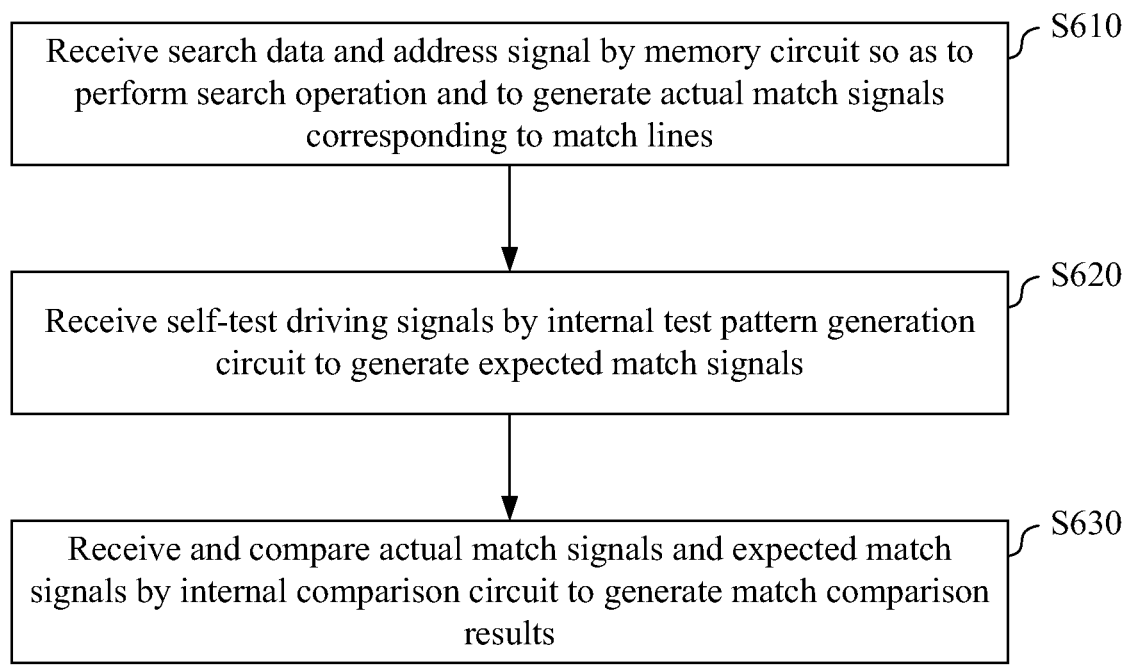
FIG. 6 illustrates a flow chart of a memory self-test method according to an embodiment of the present invention.

Reference is now made to FIG. 6. FIG. 6 illustrates a flow chart of a memory self-test method 600 according to an embodiment of the present invention.

Besides the apparatus described above, the present invention further discloses the memory self-test method 600 that can be used in such as, but not limited to the content addressable memory circuit 130 illustrated in FIG. 1. An embodiment of the memory self-test method 600 is illustrated in FIG. 6 and includes the steps outlined below.

In step S610, the search data SDI and the address signal ADD are received by the memory circuit 160 so as to perform search operation and to generate the actual match signals $SDO_0$-$SDO_{N-1}$ corresponding to the match lines ML.

In step S620, the self-test driving signals MS are received by the internal test pattern generation circuit 170 to generate the expected match signals $EDO_0$-$EDO_{N-1}$.

In step S630, the actual match signals $SDO_0$-$SDO_{N-1}$ and the expected match signals $EDO_0$-$EDO_{N-1}$ are received and compared by the internal comparison circuit 180 to generate the match comparison results $MCR_0$-$MCR_{N-1}$.

It is appreciated that the embodiments described above are merely an example. In other embodiments, it is appreciated that many modifications and changes may be made by those of ordinary skill in the art without departing, from the spirit of the invention. For example, the configuration of the memory circuit and the internal test pattern generation circuit and the implementation of the logic operation gates in the internal comparison circuit are merely an example. In other embodiments, other configurations can be used to implement these circuits. The present invention is not limited thereto.

In summary, the content addressable memory apparatus, the content addressable memory circuit and the memory self-test method thereof dispose a test pattern generation circuit and a comparison circuit in the content addressable memory circuit such that a more compact and aligned arrangement of the content addressable memory circuit, the test pattern generation circuit and the comparison circuit can be obtained to greatly reduce routing area cost and complexity of the circuits.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A content addressable memory circuit, comprising:
    a memory circuit configured to receive search data and an address signal so as to perform search operation and to generate a plurality of actual match signals corresponding to a plurality of the match lines, wherein a signal of a corresponding match line of the match lines is at a first state when the search data matches stored data related to the corresponding match line, and is at a second state when the search data does not match the stored data, and the signal of the corresponding match line is one of the actual match signals;
    an internal test pattern generation circuit configured to receive a plurality of self-test driving signals to generate a plurality of expected match signals, wherein the internal test pattern generation circuit comprises a plurality of shift registers electrically coupled in series and has an amount equaling to an amount of the match lines, the shift registers are configured to receive an input signal comprised by the self-test driving signals and transmit the input signal one-by-one according to a clock signal comprised by the self-test driving signals and each of the shift registers is further configured to receive a reset signal comprised by the self-test driving signals to generate one of the expected match signals according to the transmitted input signal and the reset signal; and
    an internal comparison circuit configured to receive and compare the actual match signals and the expected match signals to generate a plurality of match comparison results.

2. The content addressable memory circuit of claim 1, wherein the shift registers are configured to reset the expected match signals to be a high state or a low state according to the reset signal under a normal operation mode such that the internal comparison circuit directly outputs the actual match signals according to the reset expected match signals.

3. The content addressable memory circuit of claim 1, wherein a test pattern of the expected match signals is an all high state and all low state test pattern, a checkerboard test pattern or a marching test pattern.

4. The content addressable memory circuit of claim 1, wherein the internal comparison circuit comprises a plurality of logic operation gates having an amount equaling to an amount of the match lines; and
each of the logic operation gates receives one of the actual match signals and one of the expected match signals to perform logic operation thereon and generate an operation result serving as one of the match comparison results.

5. The content addressable memory circuit of claim 4, wherein each of the logic operation gates is an exclusive OR gate.

6. A content addressable memory apparatus, comprising:
an external test pattern generation circuit;
a self-test control circuit configured to generate a plurality of self-test driving signals and control the external test pattern generation circuit to generate search data and an address signal; and
a content addressable memory circuit comprising:
a memory circuit configured to receive the search data and the address signal from the external test pattern generation circuit so as to perform search operation and to generate a plurality of actual match signals corresponding to a plurality of the match lines, wherein a signal of a corresponding match line of the match lines is at a first state when the search data matches stored data related to the corresponding match line, and is at a second state when the search data does not match the stored data, and the signal of the corresponding match line is one of the actual match signals;
an internal test pattern generation circuit configured to receive the self-test driving signals from the self-test control circuit to generate a plurality of expected match signals, wherein the internal test pattern generation circuit comprises a plurality of shift registers electrically coupled in series and has an amount equaling to an amount of the match lines, the shift registers are configured to receive an input signal comprised by the self-test driving signals and transmit the input signal one-by-one according to a clock signal comprised by the self-test driving signals and each of the shift registers is further configured to receive a reset signal comprised by the self-test driving signals to generate one of the expected match signals according to the transmitted input signal and the reset signal; and
an internal comparison circuit configured to receive and compare the actual match signals and the expected match signals to generate a plurality of match comparison results such that the self-test control circuit receives the match comparison results to perform verification on the match lines accordingly.

7. The content addressable memory apparatus of claim 6, wherein the shift registers are configured to reset the expected match signals to be a high state or a low state according to the reset signal under a normal operation mode such that the internal comparison circuit directly outputs the actual match signals according to the reset expected match signals.

8. The content addressable memory apparatus of claim 6, wherein a test pattern of the expected match signals is an all high state and all low state test pattern, a checkerboard test pattern or a marching test pattern.

9. The content addressable memory apparatus of claim 6, wherein the internal comparison circuit comprises a plurality of logic operation gates having an amount equaling to an amount of the match lines; and
each of the logic operation gates receives one of the actual match signals and one of the expected match signals to perform logic operation thereon and generate an operation result serving as one of the match comparison results.

10. The content addressable memory apparatus of claim 9, wherein each of the logic operation gates is an exclusive OR gate.

11. The content addressable memory apparatus of claim 6, wherein the external test pattern generation circuit comprises:
an address generation circuit configured to generate the address signal according to the control of the self-test control circuit; and
a data generation circuit configured to generate the search data according to the control of the self-test control circuit.

12. The content addressable memory apparatus of claim 11, further comprising an external comparison circuit, wherein the data generation circuit is further configured to generate a plurality of pieces of write data according to the control of the self-test control circuit;
the external comparison circuit is configured to receive the write data from the data generation circuit, receive a plurality of pieces of read data from the content addressable memory circuit and perform compare operation on the write data and the read data to generate a plurality of read or write comparison results such that the self-test control circuit receives the read or write comparison results to perform verification on the read or write operation of the content addressable memory circuit accordingly.

13. A memory self-test method used in a content addressable memory circuit, the memory self-test method comprising:
receiving search data and an address signal by a memory circuit so as to perform search operation and to generate a plurality of actual match signals corresponding to a plurality of the match lines, wherein a signal of a corresponding match line of the match lines is at a first state when the search data matches stored data related to the corresponding match line, and is at a second state when the search data does not match the stored data, and the signal of the corresponding match line is one of the actual match signals;
receiving a plurality of self-test driving signals by an internal test pattern generation circuit to generate a plurality of expected match signals, wherein the internal test pattern generation circuit comprises a plurality of shift registers electrically coupled in series and has an amount equaling to an amount of the match lines, and the step of receiving the self-test driving signals by the internal test pattern generation circuit to generate the expected match signals further comprises:
receiving an input signal comprised by the self-test driving signals and transmitting the input signal one-by-one according to a clock signal comprised by the self-test driving signals by the shift registers; and
receiving a reset signal comprised by the self-test driving signals by each of the shift registers to generate one of the expected match signals according to the transmitted input signal and the reset signal; and receiving and comparing the actual match signals and the expected match signals by an internal comparison circuit to generate a plurality of match comparison results.

14. The memory self-test method of claim 13, further comprising:
resetting the expected match signals to be a high state or a low state according to the reset signal under a normal operation mode by the shift registers such that the internal comparison circuit directly outputs the actual match signals according to the reset expected match signals.

15. The memory self-test method of claim 13, wherein a test pattern of the expected match signals is an all high state and all low state test pattern, a checkerboard test pattern or a marching test pattern.

16. The memory self-test method of claim 13, wherein the internal comparison circuit comprises a plurality of logic operation gates having an amount equaling to an amount of the match lines, memory self-test method further comprising:
receiving one of the actual match signals and one of the expected match signals to perform logic operation thereon and generating an operation result serving as one of the match comparison results by each of the logic operation gates.

17. The memory self-test method of claim 16, wherein each of the logic operation gates is an exclusive OR gate.

* * * * *